Figures 1, 2:
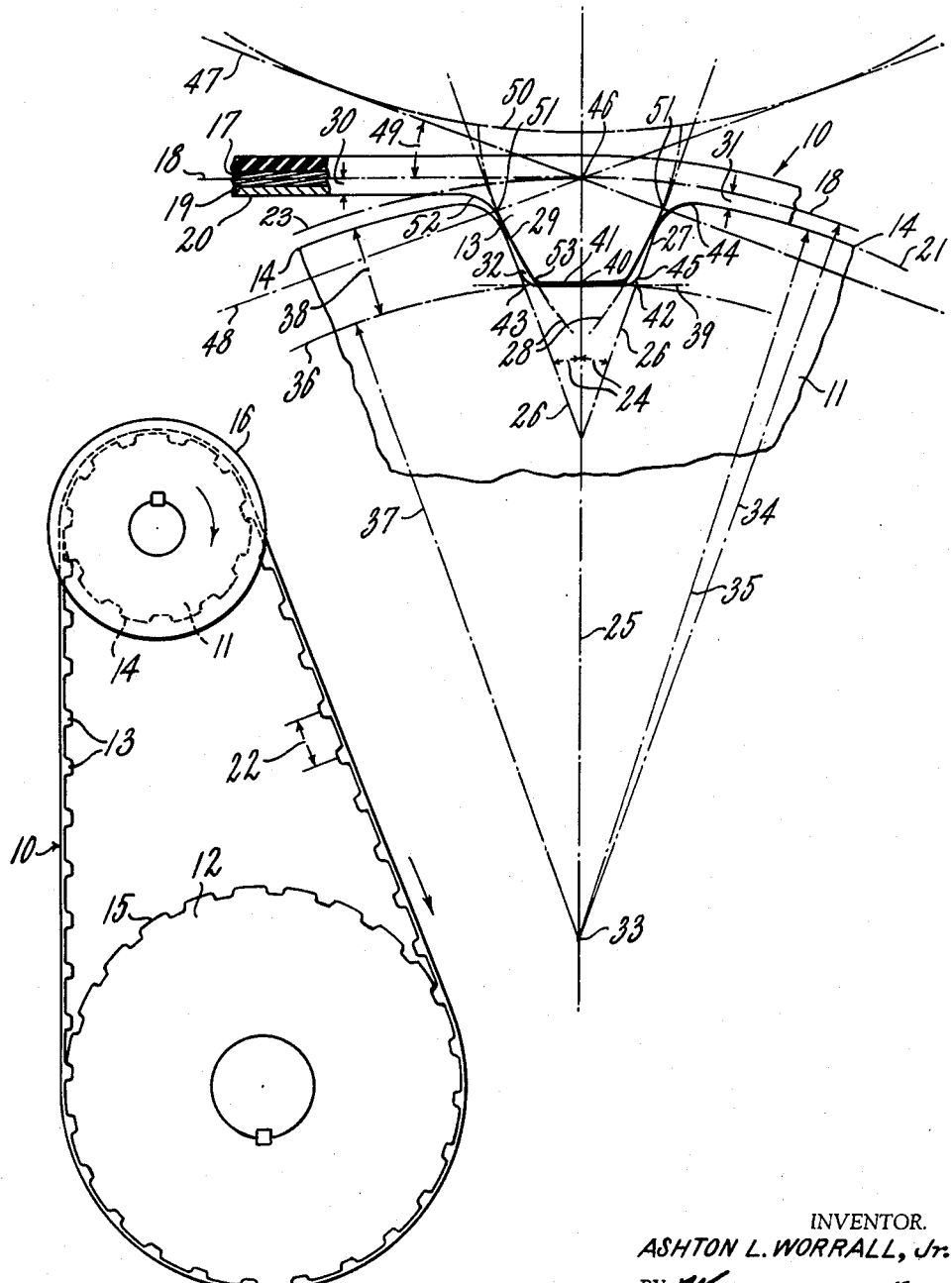

May 24, 1960

A. L. WORRALL, JR 2,937,538

BELT AND GEAR DRIVE

Filed May 9, 1958

INVENTOR.
ASHTON L. WORRALL, Jr.

BY *William R. Eyer*

ATTORNEY

United States Patent Office 2,937,538
Patented May 24, 1960

2,937,538
BELT AND GEAR DRIVE

Ashton L. Worrall, Jr., Edison, Pa., assignor to United States Rubber Company, New York, N.Y., a corporation of New Jersey Filed May 9, 1958, Ser. No. 734,286

2 Claims. (Cl. 74—229)

This invention relates to a positive power drive comprising a plurality of circular gears having wholly dedendum teeth on their peripheries provided with flat or plane working faces which mesh with wholly addendum teeth on a belt provided with involute working faces.

The power drive embodying this invention is useful for the positive transmission of motion between two or more gears, and it is particularly useful in a drive where the product of the pitch diameter of any gear in the drive and the cosine of the pressure angle of such gear is greater than the diameter of the dedendum circle of such gear.

One of the objects of this invention is to obtain conjugate action between the teeth of the belt and of the gears.

Another object of the invention is to reduce wear on the contacting surfaces of the meshing belt and gear teeth, and thereby increase the life of the power drive.

A further object of this invention is to reduce the noise and vibration resulting from the engagement or disengagement of the belt and gear teeth.

This invention, its objects and advantages are further described in reference to the accompanying drawings, in which:

Fig. 1 is an elevational view of a positive power drive embodying this invention; and Fig. 2 is an elevational view of a portion of the belt and the smallest gear in the power drive, illustrating a single tooth of the belt in the act of entering the groove between two teeth of the gear, and also illustrating the construction of the belt teeth in reference to the gear teeth.

As shown in Fig. 1, the power drive embodying this invention comprises a belt 10 which transmits motion between gears 11 and 12. The belt 10 is provided with teeth 13, which mesh with the gear teeth 14 and 15. Means are provided for keeping the belt 10 on the gears, and for that purpose, as shown herein, flanges 16 are provided for the smaller gear 11.

Excepting for the contour of the belt teeth faces, the belt 10 may be constructed as shown and described in United States Patent No. 2,507,852 to Richard Y. Case. As shown in Fig. 2 of the drawings herein, the belt 10 is provided with a strain resisting or pull member 17, the center of which forms the neutral axis, or pitch line 18 of the belt. The inside, or tooth side of the belt and teeth thereon is covered with a fabric jacket 19. However, the jacket is not essential. The exposed surface of the jacket forms the dedendum line 20 of the belt teeth 13, and when the belt goes around the gears, the dedendum line 20 coincides with the addendum circle 21 of the gear.

The belt and gears of the power drive have the following characteristics, which are described in reference to gear 11. The pitch 22 of the belt teeth 13 as measured on the pitch line 18 is equal to the pitch of the gear teeth 14 and 15 as measured on their pitch circles, of which pitch circle 23 of the gear 11 is representative as shown in Fig. 2. The pressure angle 24 of all belt and gear teeth in the system is the same as measured between a radial line 25 of any gear and the pressure angle lines 26, which coincides with the plane faces 27 of the gear teeth 14 and are tangent to the involute curves 28 which form the convex faces 29 of the belt teeth 13. The distance 30 between the pitch line of the belt and its dedendum line 20 is equal to the distance 31 between the pitch circle 23 and the addendum circle 21. The term "dedendum teeth" refers to teeth, the tops of which are wholly below the pitch circle, the entire tooth body thereby being within the pitch circle. The term "addendum teeth" refers to teeth, the tops of which are on the same side (above or below) of the pitch line as the entire tooth body. Such distances 30 and 31 are referred to as the pitch differential, and it should be as small as practical.

Having selected or determined the above mentioned characteristics, the construction of the smallest gear, upon which the belt is adapted to operate, is first determined and then the construction of the belt teeth is determined for operating in a conjugate manner on such gear, as described below. When the belt has been thus constructed, it will also operate on larger gears in the same manner, provided all such gears have the same pitch, pressure angle, pitch line differential, and width of tooth groove.

Assuming the gear 11 is the smallest gear the belt 10 is adapted to operate upon, it is first constructed, as represented by the portion of the gear 11 shown in Fig. 2, which includes portions of two teeth 14 and the groove 32 therebetween. Such portion is laid out as follows. The pitch circle 23 of the gear 11 is drawn about a center 33 with a radius 34 which will provide a pitch circle having the desired number of equally spaced grooves 32. The addendum circle is laid out with a radius 35 equal to the radius 34 of the pitch circle 23 less the pitch differential 31. The dedendum circle 36 is laid out with a radius 37 equal to the radius 35 of the addendum circle 21 less the working depth 38 of the gear teeth 14. A tangent 39 is drawn to the dedendum circle 36 at its intersection 40 with the radius 25, which passes through the center of the groove 32. One-half of the bottom width 41 of the groove 32 is laid out on the line 39 on each side of the intersection 40 to establish the corner points 42 and 43 of the groove. The pressure angle lines 26 are then drawn through the points 42 and 43 at the pressure angle 24 to the radial line 25. The extension of the lines 26 between dedendum circle 36 and the addendum circle 21 forms the straight sides or plane faces 27 of the gear teeth 14. The top and bottom of the faces 27 are rounded with arcs 44 and 45 of suitable radii. In order to complete the periphery of the gear, the groove 32 is duplicated at points spaced apart equal to the pitch 22 of the teeth measured on the pitch line 18.

Having constructed the gear 11, the contour of the belt teeth 13 is constructed as follows. Having drawn the radius 25 of the gear 11 perpendicular to the pitch line 18 of the belt to form the pitch point 46, the tooth pressure or action lines 47 and 48 are drawn through the pitch point 46 at an angle 49 to the pitch line 18 of the belt 10 equal to the pressure angle 24. The base circle 50 is drawn from a center (not shown) on the radial line 25 outside of the pitch circle 23 of the gear 11, and with a radius equal to the product of the radius 34 of the pitch circle and the cosine of the pressure angle 24, and so that the lines 47 and 48 are tangent to the circle 50. The involute curves 28 are derived from the base circle 50 and are tangent to the pressure angle lines 26 at the intersections 51 of the lines 26 with the lines 47 and 48 where the lines 26 are perpendicular to the lines 47 and 48. The working faces 29 of the belt teeth 13 are formed by that portion of the involute curves 28, which extend between the dedendum line 20 of the belt 10 and the dedendum circle 36 of the gear, exclusive of arcs 52 and 53 of suitable radii at the bottom and top of the teeth. As described herein no clearance is provided between the belt teeth and the gear teeth. Suitable clearance may be provided in accordance with conventional practice.

While the preferred form of this invention has been shown and described herein, it is to be understood that changes may be made without departing from the spirit of the invention, and it is intended to cover any such changes which fall within the scope of the appended claims.

Having thus described my invention, what I claim and desire to protect by Letters Patent is:

1. A positive power drive comprising a plurality of circular gears of equal or different diameters, the gear having the smallest diameter having the smallest pitch circle, said gears having entirely dedendum teeth on their peripheries and a flexible belt having entirely addendum teeth thereon adapted to mesh with the teeth of said gears, said teeth on said circular gears having plane working faces of a predetermined pressure angle, said belt having a pitch line, any point on said pitch line being a pitch point, said teeth on said belt having convex working faces conforming to an involute curve derived from a base circle having a radius equal to the product of the cosine of the said pressure angle of said gears and the smallest pitch circle radius of the said smallest gear selected for conjugate action with said belt, said base circle having its center located outside of said pitch circle on an extended radius thereof perpendicular to the said pitch line of said belt at the pitch point of said belt and said smallest gear, said base circle having tangents passing through said pitch point at an angle to said pitch line equal to said pressure angle, and said involute curve for each face of the belt tooth at said pitch point passing through the intersection of the pressure line of that face and the said tangent perpendicular thereto.

2. A positive power drive comprising a plurality of circular gears of equal or different diameters, the gear having the smallest diameter having the smallest pitch circle, said gears having entirely dedendum teeth on their peripheries and a flexible belt having entirely addendum teeth thereon adapted to mesh with the teeth of said gears, said teeth on said circular gears having plane working faces of a predetermined pressure angle, said belt having a linear pitch line, any point on said pitch line being a pitch point, the product of the pitch diameter and the cosine of the pressure angle of the smallest gear in said drive being greater than the diameter of the dedendum circle of said smallest gear, said teeth on said circular gears having plane working faces, said teeth on said belt having convex working faces conforming to an involute curve derived from a base circle having a radius equal to the product of the cosine of said pressure angle and the smallest pitch circle radius of any gear selected for conjugate action with said belt, said base circle having its center located outside of said pitch circle on an extended radius thereof perpendicular to the linear pitch line of said belt at the pitch point of said belt and said smallest gear, said base circle having tangents passing through said pitch point at an angle to said pitch line equal to said pressure angle and said involute curve for each face of the belt tooth at said pitch point passing through the intersection of the pressure line of that face and the said tangent perpendicular thereto.

References Cited in the file of this patent

UNITED STATES PATENTS 2,507,852   Case _____ May 16, 1950

FOREIGN PATENTS 1,069,964   France _____ Feb. 17, 1954

OTHER REFERENCES

"The Involute Gear," published by "The Fellows Gear Shaper Company," Springfield, Vermont (copyright 1920), pages relied on: 19, 20, 33, and 34.